(12) United States Patent
Sasaki

(10) Patent No.: US 7,039,754 B2
(45) Date of Patent: May 2, 2006

(54) DETACHABLY MOUNTED REMOVABLE DATA STORAGE DEVICE

(75) Inventor: Junko Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 10/480,706

(22) PCT Filed: Apr. 14, 2003

(86) PCT No.: PCT/JP03/04708

§ 371 (c)(1),
(2), (4) Date: Dec. 11, 2003

(87) PCT Pub. No.: WO03/088043

PCT Pub. Date: Oct. 23, 2003

(65) Prior Publication Data

US 2005/0036372 A1    Feb. 17, 2005

(30) Foreign Application Priority Data

Apr. 15, 2002  (JP) .............................. 2002-112635

(51) Int. Cl.
*G06F 12/02* (2006.01)

(52) U.S. Cl. .......................... 711/103; 711/2; 711/166; 365/185.29; 365/185.33; 365/218; 710/13

(58) Field of Classification Search ................ 711/103, 711/2, 5, 102, 166, 170, 173; 713/2; 710/13, 710/16, 301, 302, 304, 104; 365/185.29, 365/185.33, 218
See application file for complete search history.

(56) References Cited

U.S. PATENT DOCUMENTS 6,601,056 B1 *  7/2003  Kagle et al. ................... 707/1
6,687,814 B1 *  2/2004  Duppong ....................... 713/1
6,766,417 B1 *  7/2004  Tanaka et al. .............. 711/115

* cited by examiner

*Primary Examiner*—B. James Peikari
(74) *Attorney, Agent, or Firm*—Frommer Lawrence & Haug LLP; William S. Frommer; Thomas F. Presson

(57) ABSTRACT

A removable memory card detachably mounted to a host device. The memory card includes a non-volatile semiconductor memory in which data recorded in the memory is erased as a block of a predetermined data volume. An interface for inputting/outputting data between the data storage device and said host device, and a controller for controlling file management in the semiconductor memory in response to a command from said host device over said interface is also used. Parameters for recording file management data are stored in a system information storage unit. The controller records the file management data in the semiconductor memory when supplied with an initialization command from said host device.

28 Claims, 19 Drawing Sheets

| ITEM | | CONTENTS |
|---|---|---|
| ATRB INFO AREA CONFIRMATION | | REPRESENTS ATTRIBUTE INFORMATION AREA |
| DEVICE-INFORMATION ENTRY | | DEVICE-INFO POSITION INFORMATION |
| DEVICE-INFORMATION | SYSTEM INFORMATION | INNER INFORMATION OF MEMORY CARD |
| | MBR VALUES | RECOMMENDED MBR PARAMETERS |
| | PBR VALUES | RECOMMENDED PBR PARAMETERS |

| LBA SECTOR NUMBER | CLUSTER SIZE < BLOCK SIZE [128 Kbytes] | |
|---|---|---|
| | BLOCK NUMBER | DATA CONTENTS |
| 0 | 0 | MBR |
| 1 | ↓ | VOID |
| 2 | ↓ | ↓ |
| 3 | ↓ | ↓ |
| 253 | ↓ | ↓ |
| 254 | ↓ | ↓ |
| 255 | 0 | ↓ |
| 256 | 1 | ↓ |
| 257 | ↓ | ↓ |
| 258 | ↓ | ↓ |
| 259 | ↓ | ↓ |
| 260 | ↓ | ↓ |
| 457 | ↓ | ↓ |
| 458 | ↓ | ↓ |
| 459 | ↓ | ↓ |
| 460 | ↓ | ↓ |
| 461 | ↓ | ↓ |
| 462 | ↓ | VOID |
| 463 | ↓ | PBR |
| 464 | ↓ | FAT1 |
| 465 | ↓ | ↓ |
| 471 | ↓ | FAT1 |
| 472 | ↓ | FAT2 |
| 473 | ↓ | ↓ |
| 479 | ↓ | FAT2 |
| 480 | ↓ | ROOT DIRECTORY ENTRY |
| 481 | ↓ | ↓ |
| 497 | ↓ | ↓ |
| 498 | ↓ | ↓ |
| 499 | ↓ | ↓ |
| 511 | 1 | ROOT DIRECTORY ENTRY |
| 512 | 2 | CLUSTER2 |
| 513 | ↓ | ↓ |
| 573 | ↓ | ↓ |
| 574 | ↓ | ↓ |
| 575 | ↓ | CLUSTER2 |
| 576 | ↓ | CLUSTER3 |
| 577 | ↓ | ↓ |
| 637 | ↓ | ↓ |
| 638 | ↓ | ↓ |
| 639 | ↓ | CLUSTER3 |
| 640 | ↓ | CLUSTER4 |
| 641 | ↓ | ↓ |
| 701 | ↓ | ↓ |
| 702 | ↓ | ↓ |
| 703 | ↓ | CLUSTER4 |
| 704 | ↓ | CLUSTER5 |
| 705 | ↓ | ↓ |
| 765 | ↓ | ↓ |
| 766 | ↓ | ↓ |
| 767 | 2 | CLUSTER5 |
| 768 | 3 | CLUSTER6 |
| 769 | ↓ | ↓ |

| LogBlk No. | LBA Sector | Cluster | CONTENTS |
|---|---|---|---|
| 0 | 0 | none | MBR |
| : | : | : | : Cluster BOUNDARY ADJUSTMENT |
| 1 | 463 | none | PBR |
| 1 | 464 | none | FAT Start |
| 1 | 471 | none | FAT End |
| 1 | 472 | none | FAT (2nd) Start |
| 1 | 479 | none | FAT (2nd) End |
| 1 | 480 | none | Root Directory Entry Start |
| 1 | 511 | none | Root Directory Entry End |
| 2 | 512 | 2 | Data(cluster start) |
| 2 | 575 | 2 | Data(cluster end) |
| 2 | 576 | 3 | Data(cluster start) |
| 2 | 639 | 3 | Data(cluster end) |
| 2 | 640 | 4 | Data(cluster start) |
| 2 | 703 | 4 | Data(cluster end) |
| 2 | 704 | 5 | Data(cluster start) |
| 2 | 767 | 5 | Data(cluster end) |
| 3 | 768 | 6 | Data(cluster start) |
| 3 | 831 | 6 | Data(cluster end) |
| 3 | 832 | 7 | Data(cluster start) |
| 3 | 895 | 7 | Data(cluster end) |
| 3 | 896 | 8 | Data(cluster start) |
| 3 | 859 | 8 | Data(cluster end) |
| : | : | : | : |
| 495 | 126975 | 1977 | Data(cluster end) |
| 495 | 126975 | 1977 | Reserved Data |
| : | : | : | : CHS ADJUSTMENT |
| 495 | 126975 | 1977 | Reserved Data |

FIG. 9

| MBR | |
|---|---|
| BOOT IDENTIFICATION | 80 |
| START HEAD NUMBER | 0E |
| START SECTOR NUMBER | 10 |
| START CYLINDER NUMBER | 0 |
| SYSTEM IDENTIFICATION | 06 |
| LAST HEAD NUMBER | 0F |
| LAST SECTOR NUMBER | E0 |
| LAST CYLINDER NUMBER | F7 |
| START LOGICAL SECTOR NUMBER | 000001CF |
| PARTITION SIZE | 0001EE31 |

FIG. 10

| PBR (FAT16) | |
|---|---|
| JUMP CODE | E90000 |
| OEM NAMES AND VERSION | 20202020<br>20202020 |
| NUMBER OF BYTES PER SECTOR | 0200 |
| NUMBER OF SECTORS PER CLUSTER | 40 |
| NUMBER OF RESERVED SECTORS | 0001 |
| NUMBER OF FATS | 02 |
| NUMBER OF ROOT DIRECTORY ENTRIES | 0200 |
| NUMBER OF LOGICAL SECTORS (<65536) | 0 |
| MEDIUM ID | F8 |
| NUMBER OF SECTORS PER FAT | 8 |
| NUMBER OF SECTORS PER HEAD | 20 |
| NUMBER OF HEADS | 10 |
| NUMBER OF HIDDEN SECTORS | 000001CF |
| NUMBER OF LOGICAL SECTORS (>=65536) | 0001EE31 |
| PHYSICAL DRIVE NUMBER | 0 |
| RESERVED | 0 |
| EXPANSION CODE IDENTIFICATION CODE | 29 |
| VOLUME SERIAL NUMBER | 0 |
| VOLUME LABEL | 20202020<br>20202020<br>202020 |
| FILE SYSTEM TYPE | "FAT16 " |

FIG. 11

| LBA SECTOR NUMBER | CLUSTER SIZE < BLOCK SIZE [128 Kbytes] (BOUNDARY IN FAT IS TAKEN INTO ACCOUNT) | |
|---|---|---|
| | BLOCK NUMBER | DATA CONTENTS |
| 0 | 0 | MBR |
| 1 | ↓ | VOID |
| 2 | ↓ | ↓ |
| 3 | ↓ | ↓ |
| 224 | ↓ | ↓ |
| 225 | ↓ | ↓ |
| 254 | ↓ | ↓ |
| 255 | 0 | ↓ |
| 256 | 1 | ↓ |
| 257 | ↓ | ↓ |
| 319 | ↓ | ↓ |
| 320 | ↓ | ↓ |
| 321 | ↓ | ↓ |
| 334 | ↓ | VOID |
| 335 | ↓ | PBR |
| 336 | ↓ | FAT1 |
| 337 | ↓ | ↓ |
| 343 | ↓ | FAT1 |
| 344 | ↓ | FAT2 |
| 345 | ↓ | ↓ |
| 351 | ↓ | FAT2 |
| 352 | ↓ | ROOT DIRECTORY ENTRY |
| 353 | ↓ | ↓ |
| 382 | ↓ | ↓ |
| 383 | ↓ | ROOT DIRECTORY ENTRY |
| 384 | ↓ | CLUSTER2 |
| 385 | ↓ | ↓ |
| 445 | ↓ | ↓ |
| 446 | ↓ | ↓ |
| 447 | ↓ | CLUSTER2 |
| 448 | ↓ | CLUSTER3 |
| 449 | ↓ | ↓ |
| 509 | ↓ | ↓ |
| 510 | ↓ | ↓ |
| 511 | 1 | CLUSTER3 |
| 512 | 2 | CLUSTER4 |
| 513 | ↓ | ↓ |
| 575 | ↓ | CLUSTER4 |
| 576 | ↓ | CLUSTER5 |
| 638 | ↓ | ↓ |
| 639 | ↓ | CLUSTER5 |
| 640 | ↓ | CLUSTER6 |
| 641 | ↓ | ↓ |
| 703 | ↓ | CLUSTER6 |
| 704 | ↓ | CLUSTER7 |
| 705 | ↓ | ↓ |
| 765 | ↓ | ↓ |
| 766 | ↓ | ↓ |
| 767 | 2 | CLUSTER7 |
| 768 | 3 | CLUSTER8 |
| 769 | ↓ | ↓ |

FIG. 12

| LogBlk No. | LBA Sector | Cluster | CONTENTS |
|---|---|---|---|
| 0 | 0 | none | MBR |
| : | : | : | : Cluster BOUNDARY ADJUSTMENT |
| 1 | 335 | none | PBR |
| 1 | 336 | none | FAT Start |
| 1 | 343 | none | FAT End |
| 1 | 344 | none | FAT (2nd) Start |
| 1 | 351 | none | FAT (2nd) End |
| 1 | 352 | none | Root Directory Entry Start |
| 1 | 383 | none | Root Directory Entry End |
| 1 | 384 | 2 | Data(cluster start) |
| 1 | 447 | 2 | Data(cluster end) |
| 1 | 448 | 3 | Data(cluster start) |
| 1 | 511 | 3 | Data(cluster end) |
| 2 | 512 | 4 | Data(cluster start) |
| 2 | 575 | 4 | Data(cluster end) |
| 2 | 576 | 5 | Data(cluster start) |
| 2 | 639 | 5 | Data(cluster end) |
| 2 | 640 | 6 | Data(cluster start) |
| 2 | 703 | 6 | Data(cluster end) |
| 2 | 704 | 7 | Data(cluster start) |
| 2 | 767 | 7 | Data(cluster end) |
| 3 | 768 | 8 | Data(cluster start) |
| 3 | 831 | 8 | Data(cluster end) |
| : | : | : | : |
| 495 | 126975 | 1979 | Data(cluster end) |
| 495 | 126975 | 1979 | Reserved Data |
| : | : | : | : CHS ADJUSTMENT |
| 495 | 126975 | 1979 | Reserved Data |

FIG. 13

| MBR | |
|---|---|
| BOOT IDENTIFICATION | 80 |
| START HEAD NUMBER | 0A |
| START SECTOR NUMBER | 10 |
| START CYLINDER NUMBER | 0 |
| SYSTEM IDENTIFICATION | 06 |
| LAST HEAD NUMBER | 0F |
| LAST SECTOR NUMBER | E0 |
| LAST CYLINDER NUMBER | F7 |
| START LOGICAL SECTOR NUMBER | 0000014F |
| PARTITION SIZE | 0001EEB1 |

FIG. 14

| PBR (FAT16) | |
|---|---|
| JUMP CODE | E90000 |
| OEM NAMES AND VERSION | 20202020 20202020 |
| NUMBER OF BYTES PER SECTOR | 0200 |
| NUMBER OF SECTORS PER CLUSTER | 40 |
| NUMBER OF RESERVED SECTORS | 0001 |
| NUMBER OF FATS | 02 |
| NUMBER OF ROOT DIRECTORY ENTRIES | 0200 |
| NUMBER OF LOGICAL SECTORS (<65536) | 0000 |
| MEDIUM ID | F8 |
| NUMBER OF SECTORS PER FAT | 0008 |
| NUMBER OF SECTORS PER HEAD | 0020 |
| NUMBER OF HEADS | 0010 |
| NUMBER OF HIDDEN SECTORS | 0000014F |
| NUMBER OF LOGICAL SECTORS (>=65536) | 0001EEB1 |
| PHYSICAL DRIVE NUMBER | 00 |
| RESERVED | 00 |
| EXPANSION CODE IDENTIFICATION CODE | 29 |
| VOLUME SERIAL NUMBER | 00000000 |
| VOLUME LABEL | 20202020 20202020 202020 |
| FILE SYSTEM TYPE | "FAT16   " |

FIG. 15

| sector | FAT SPECIFICATIONS |
|---|---|
| | DATA CONTENTS |
| 0 | MBR |
| 1 | PBR |
| 2 | FAT1 |
| 3 | ↓ |
| 4 | ↓ |
| 5 | ↓ |
| 6 | ↓ |
| 7 | ↓ |
| 8 | ↓ |
| 9 | FAT1 |
| 10 | FAT2 |
| 11 | ↓ |
| 12 | ↓ |
| 13 | ↓ |
| 14 | ↓ |
| 15 | ↓ |
| 16 | ↓ |
| 17 | FAT2 |
| 18 | ROOT DIRECTORY ENTRY |
| 19 | ↓ |
| 48 | ↓ |
| 49 | ROOT DIRECTORY ENTRY |
| 50 | CLUSTER2 |
| 51 | ↓ |
| 110 | ↓ |
| 111 | ↓ |
| 112 | ↓ |
| 113 | CLUSTER2 |
| 114 | CLUSTER3 |
| 115 | ↓ |
| 175 | ↓ |
| 176 | ↓ |
| 177 | CLUSTER3 |
| 178 | CLUSTER4 |
| 179 | ↓ |
| 239 | ↓ |
| 240 | ↓ |
| 241 | CLUSTER4 |
| 242 | CLUSTER5 |
| 243 | ↓ |
| 303 | ↓ |
| 304 | ↓ |
| 305 | CLUSTER5 |
| 306 | CLUSTER6 |
| 307 | ↓ |
| 367 | ↓ |
| 368 | ↓ |
| 369 | CLUSTER6 |
| 370 | CLUSTER7 |

FIG. 18

| sector | CLUSTER SIZE > BLOCK SIZE [16 Kbytes] | |
|---|---|---|
| | BLOCK NUMBER | DATA CONTENTS |
| 0 | 0 | MBR |
| 1 | ↓ | VOID |
| 2 | ↓ | ↓ |
| 3 | ↓ | ↓ |
| 9 | ↓ | ↓ |
| 10 | ↓ | ↓ |
| 11 | ↓ | ↓ |
| 17 | ↓ | ↓ |
| 18 | ↓ | ↓ |
| 19 | ↓ | ↓ |
| 31 | 0 | ↓ |
| 32 | 1 | ↓ |
| 33 | ↓ | ↓ |
| 46 | ↓ | VOID |
| 47 | ↓ | PBR |
| 48 | ↓ | FAT1 |
| 49 | ↓ | ↓ |
| 50 | ↓ | ↓ |
| 51 | ↓ | ↓ |
| 55 | ↓ | FAT1 |
| 56 | ↓ | FAT2 |
| 57 | ↓ | ↓ |
| 63 | 1 | FAT2 |
| 64 | 2 | ROOT DIRECTORY ENTRY |
| 65 | ↓ | ↓ |
| 78 | ↓ | ↓ |
| 79 | ↓ | ↓ |
| 80 | ↓ | ↓ |
| 81 | ↓ | ↓ |
| 87 | ↓ | ↓ |
| 88 | ↓ | ↓ |
| 89 | ↓ | ↓ |
| 95 | 2 | ROOT DIRECTORY ENTRY |
| 96 | 3 | CLUSTER2 |
| 97 | ↓ | ↓ |
| 113 | ↓ | ↓ |
| 114 | ↓ | ↓ |
| 115 | ↓ | ↓ |
| 127 | 3 | ↓ |
| 128 | 4 | ↓ |
| 129 | ↓ | ↓ |
| 159 | 4 | CLUSTER2 |
| 160 | 5 | CLUSTER3 |
| 161 | ↓ | ↓ |
| 177 | ↓ | ↓ |
| 178 | ↓ | ↓ |
| 179 | ↓ | ↓ |
| 191 | 5 | ↓ |
| 192 | 6 | ↓ |
| 193 | ↓ | ↓ |
| 223 | 6 | CLUSTER3 |
| 224 | 7 | CLUSTER4 |
| 225 | ↓ | ↓ |
| 241 | ↓ | ↓ |

FIG. 19

| sector | CLUSTER SIZE = BLOCK SIZE [32 Kbytes] MAP2 | |
|---|---|---|
| | BLOCK NUMBER | DATA CONTENTS |
| 0 | 0 | MBR |
| 1 | ↓ | VOID |
| 61 | ↓ | ↓ |
| 62 | ↓ | ↓ |
| 63 | 0 | ↓ |
| 64 | 1 | ↓ |
| 65 | ↓ | ↓ |
| 66 | ↓ | ↓ |
| 77 | ↓ | ↓ |
| 78 | ↓ | VOID |
| 79 | ↓ | PBR |
| 80 | ↓ | FAT1 |
| 81 | ↓ | ↓ |
| 85 | ↓ | ↓ |
| 86 | ↓ | ↓ |
| 87 | ↓ | FAT1 |
| 88 | ↓ | FAT2 |
| 89 | ↓ | ↓ |
| 94 | ↓ | ↓ |
| 95 | ↓ | FAT2 |
| 96 | ↓ | ROOT DIRECTORY ENTRY |
| 97 | ↓ | ↓ |
| 98 | ↓ | ↓ |
| 124 | ↓ | ↓ |
| 125 | ↓ | ↓ |
| 126 | ↓ | ↓ |
| 127 | 1 | ROOT DIRECTORY ENTRY |
| 128 | 2 | CLUSTER2 |
| 129 | ↓ | ↓ |
| 189 | ↓ | ↓ |
| 190 | ↓ | ↓ |
| 191 | 2 | CLUSTER2 |
| 192 | 3 | CLUSTER3 |
| 193 | ↓ | ↓ |
| 253 | ↓ | ↓ |
| 254 | ↓ | ↓ |
| 255 | 3 | CLUSTER3 |
| 256 | 4 | CLUSTER4 |
| 257 | ↓ | ↓ |
| 317 | ↓ | ↓ |
| 318 | ↓ | ↓ |
| 319 | 4 | CLUSTER4 |
| 320 | 5 | CLUSTER5 |
| 321 | ↓ | ↓ |
| 381 | ↓ | ↓ |
| 382 | ↓ | ↓ |
| 383 | 5 | CLUSTER5 |
| 384 | 6 | CLUSTER6 |
| 385 | ↓ | ↓ |

FIG. 20

DETACHABLY MOUNTED REMOVABLE DATA STORAGE DEVICE

TECHNICAL FIELD

This invention relates to a data storage device having an inner non-volatile semiconductor memory.

This application claims priority of Japanese Patent Application No. 2002-112635, filed in Japan on Apr. 15, 2002, the entirety of which is incorporated by reference herein.

BACKGROUND ART

Up to now, a IC memory device, termed a memory card, that employs a NAND flash memory has been in use as a data storage device. This IC memory device may be mounted to or dismounted from the recording and/or reproducing apparatus. The memory card is able to store a large variety of digital data, such as still image data, moving picture data, speech data or music data. For this reason, the memory card is used as an external storage medium in a wide variety of host devices, such as a portable information terminal, a desk top computer, a notebook computer, a mobile phone, an audio device, or a household electrical device.

The host device that employs the memory card as an external storage medium, is sometimes provided with an internal storage medium, such as a hard disc. The hard disc is usually accessed with a logical format from the host device, using a file system, called the MS-DOS™, as a vehicle. It is desirable that the file system is compatible with the memory card.

In the file system, file management data, such as the MBR (master boot record), PBR (partition boot record), FAT (file allocation table), and the root entry record, are recorded in a user area of a storage medium, by way of initialization. By recording the file management data, by way of initialization, the storage medium may be accessed by an operating system on the side of the host device. Consequently, the memory card is also initialized by the host device writing the aforementioned file management data in its flash memory.

Meanwhile, there are occasions where the capacity of a flash memory of a memory card differs from that of another memory card of the same standard as the first-stated memory card. If the memory cards of different capacities are to be initialized as external mediums, a host device, operating as a data recording and/or reproducing apparatus, has to be provided with initialization parameters or with initialization controlling processing programs, representing the contents of the MBR and so forth associated with the respective different capacities.

That is, the host device cannot cope with a memory card of a new capacity, even if the host device is provided with initialization parameters.

DISCLOSURE OF THE INVENTION

It is therefore an object of the present invention to provide a novel data storage device whereby the problem inherent in the conventional data storage medium, such as IC memory device, may be overcome.

It is another object of the present invention to provide a data storage device whereby initialization may be achieved extremely readily without the host device having to be provided with a control program or parameters for initialization.

For accomplishing the above objects, the present invention provides a removable data storage device, detachably mounted to a host device, comprising a non-volatile semiconductor memory in which data recorded thereon is erased as a block of a predetermined data volume, a system information storage unit having the inner information of the data storage device recorded therein, an interface for inputting/outputting data between the data storage device and the host device, and a controller for managing control for the semiconductor memory, based on a command supplied from the host device over the interface. A user area where data is recorded by a user, is provided in the semiconductor memory. File management data is recorded in the user area, in agreement with the logical format, executing file management in terms of a cluster of a size equal to 1/n times the size of the block, as a unit, n being an integer not less than two, the host device accessing the user area based on the logical format. There is stored in the system information storage unit parameters for recording the file management data on the user area. When supplied with an initialization command from the host device, the controller records in the semiconductor memory the file management data which is in agreement with parameters stored in the system information storage unit.

Other objects, features and advantages of the present invention will become more apparent from reading the embodiments of the present invention as shown in the drawings.

BRIEF DESCRIPTION OF THE DRAWINGS

FIG. 6 shows a data structure recorded in an attribute information area.

FIG. 8 depicts an image of a medium in case the format of a first specified instance is applied.

FIG. 9 depicts the values of the parameters in case the format of the first specified instance is applied.

FIG. 10 depicts the contents of description of MBR in case the format of the first specified instance is applied.

FIG. 11 depicts the contents of description of PBR in case the format of the first specified instance is applied.

FIG. 12 depicts an image of a medium in case the format of a second specified instance is applied.

FIG. 13 depicts values of respective parameters in case the format of the second specified instance is applied.

FIG. 14 depicts the contents of description of MBR in case the format of the second specified instance is applied.

FIG. 15 depicts the contents of description of MBR in case the format of the second specified instance is applied.

FIG. 18 depicts an image of a medium of a routine format.

FIG. 19 depicts an image of a medium of a memory card in which the cluster size is smaller than the block size.

FIG. 20 depicts an image of a medium of a memory card in which the block size is equal to the cluster size.

BEST MODE FOR CARRYING OUT THE INVENTION

In the following, an instance in which the present invention is applied to a removable small-sized IC memory device, and an instance in which the present invention is applied to a data processing apparatus employing this small-sized IC memory device as an external storage medium, is explained.

In the following explanation, a small-sized IC memory device is termed a memory card, whilst a data processing apparatus, to which the memory card is connected, is termed a host device.

Figure 1:
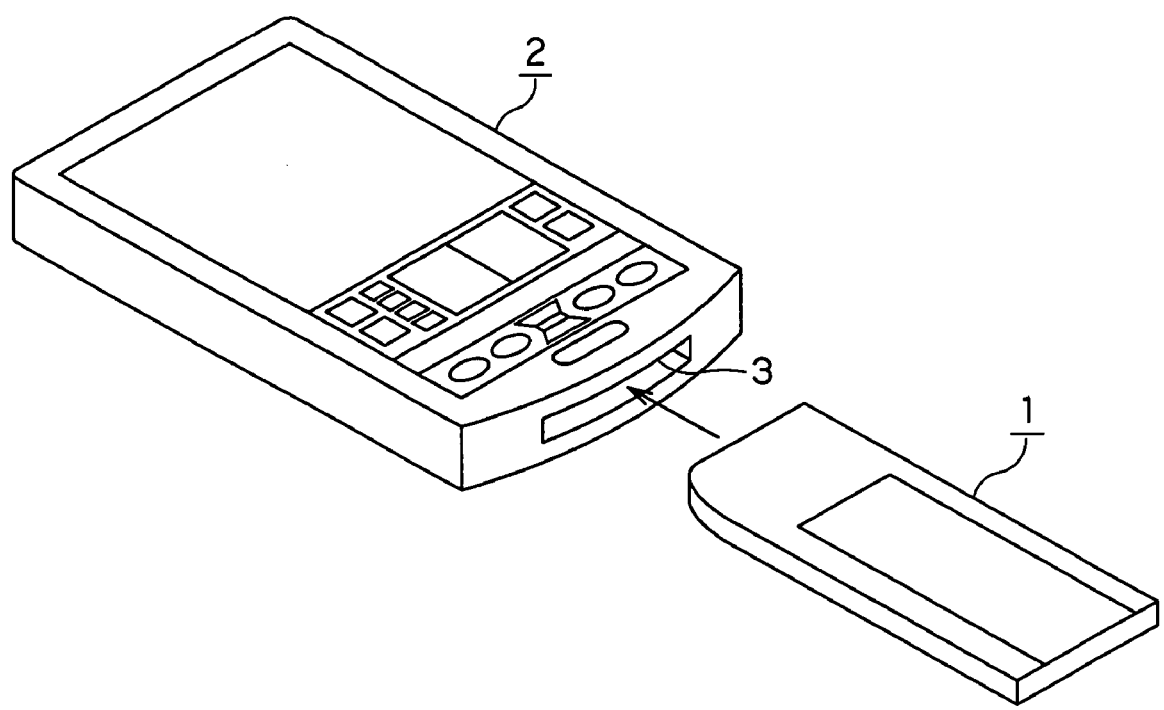
FIG. 1 is a perspective view showing a memory card embodying the present invention and a host device employing this memory card.

First, the schematics of the host device embodying the present invention and the memory card connected to this host device are explained by referring to FIG. 1.

A memory card 1 of the present invention includes an inner non-volatile semiconductor memory (IC memory), and is able to store various digital data, such as still picture data, moving picture data, speech data and music data. This memory card 1 operates as an external storage medium for a host device 2, such as, for example a portable information terminal, a desk top computer, a notebook computer, a mobile phone, audio equipment, or a household electrical apparatus.

Referring to FIG. 1, the memory card 1 is used in such a state in which it is inserted into an insertion/removal port 3 provided to the host device 2. The memory card 1 can be freely inserted into and detached from the insertion/removal port 3 by a user. Thus, the memory card 1 inserted into a host device can be extracted therefrom and inserted into another host device. That is, the present memory card 1 can be used for exchanging data between the different host devices.

The memory card 1 and the host device 2 transfer data over a parallel interface employing a six line half duplex parallel protocol configured for transmitting six signals, namely 4-bit parallel data, a clock signal and a bus state signal.

Figure 2:
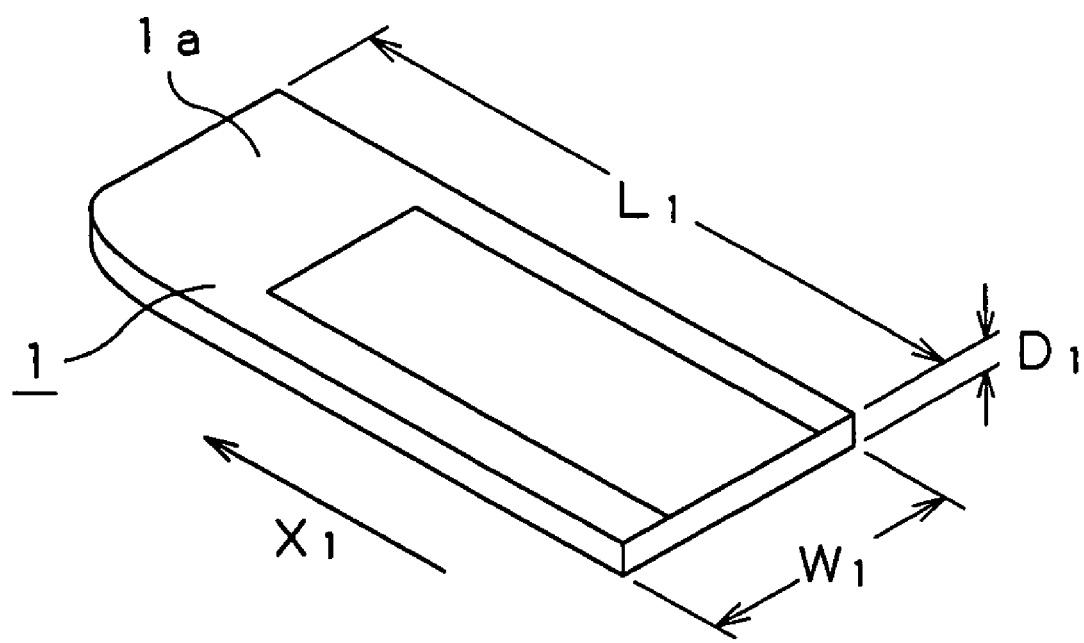
FIG. 2 is a perspective view showing the memory card from its front side.
Figure 3:
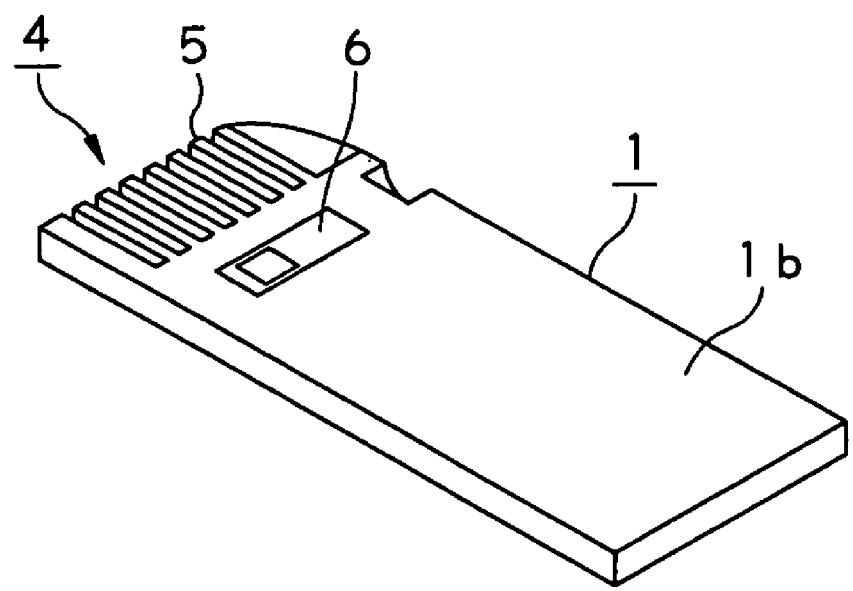
FIG. 3 is a perspective view showing the memory card from its rear side.

Referring to FIG. 2, the memory card 1 of the present invention is formed as a substantially rectangular thin sheet, having a length L1 along the longitudinal direction of 50 mm, a width W1 of 21.45 mm and a thickness D1 of 2.8 mm. The memory card 1 has a front surface 1a and its opposite surface as a reverse surface 1b. On the reverse surface 1b towards one longitudinal end of the memory card 1, a set of connection terminals 4 as ten planar electrodes are formed, as shown in FIG. 3. These electrodes, forming the set of the connection terminals 4, are provided parallel to one another along the width of the memory card 1. Between the neighboring electrodes, there are provided partitions 5 upstanding from the reverse surface 1b. These partitions 5 serve for preventing the connection terminals, connected to the respective electrodes, from being contacted with the other electrodes. A slide switch 6 for prohibiting inadvertent erasure is provided centrally towards the aforementioned one end of the reverse surface 1b of the memory card 1, as shown in FIG. 3.

The host device 2, to which the memory card 1 is mounted, is provided with the insertion/removal port 3 for inserting and detaching the memory card 1. This insertion/removal port 3 is formed in the front surface of the host device 2 as an opening of the same width W1 and thickness D1 as those of the memory card 1, as shown in FIG. 1. The memory card 1, inserted into the host device 2 through the insertion/removal port 3, is held by the host device 2 against incidental detachment by the connection terminals of the host device 2 being connected to the respective electrodes that make up the set of the connection terminals 4. Meanwhile, the connection terminals, not shown, provided to the host device 2, are provided with ten contacts in meeting with the number of the electrodes that make up the set of the connection terminals 4 provided to the loaded memory card 1.

The memory card 1 according to the present invention is loaded on the host device 2, with its end provided with the set of the connection terminals 4 as an inserting end and with the direction of an arrow X1 in FIG. 2 as an inserting direction. When the memory card 1 is loaded on the host device 2, the respective electrodes that make up the set of the connection terminals 4 are connected to the respective contacts of the connection terminals provided to the host device 2 to enable exchange of electrical signals.

The inner structure of the memory card 1 of the present invention is now explained with reference to FIG. 4.

Figure 4:
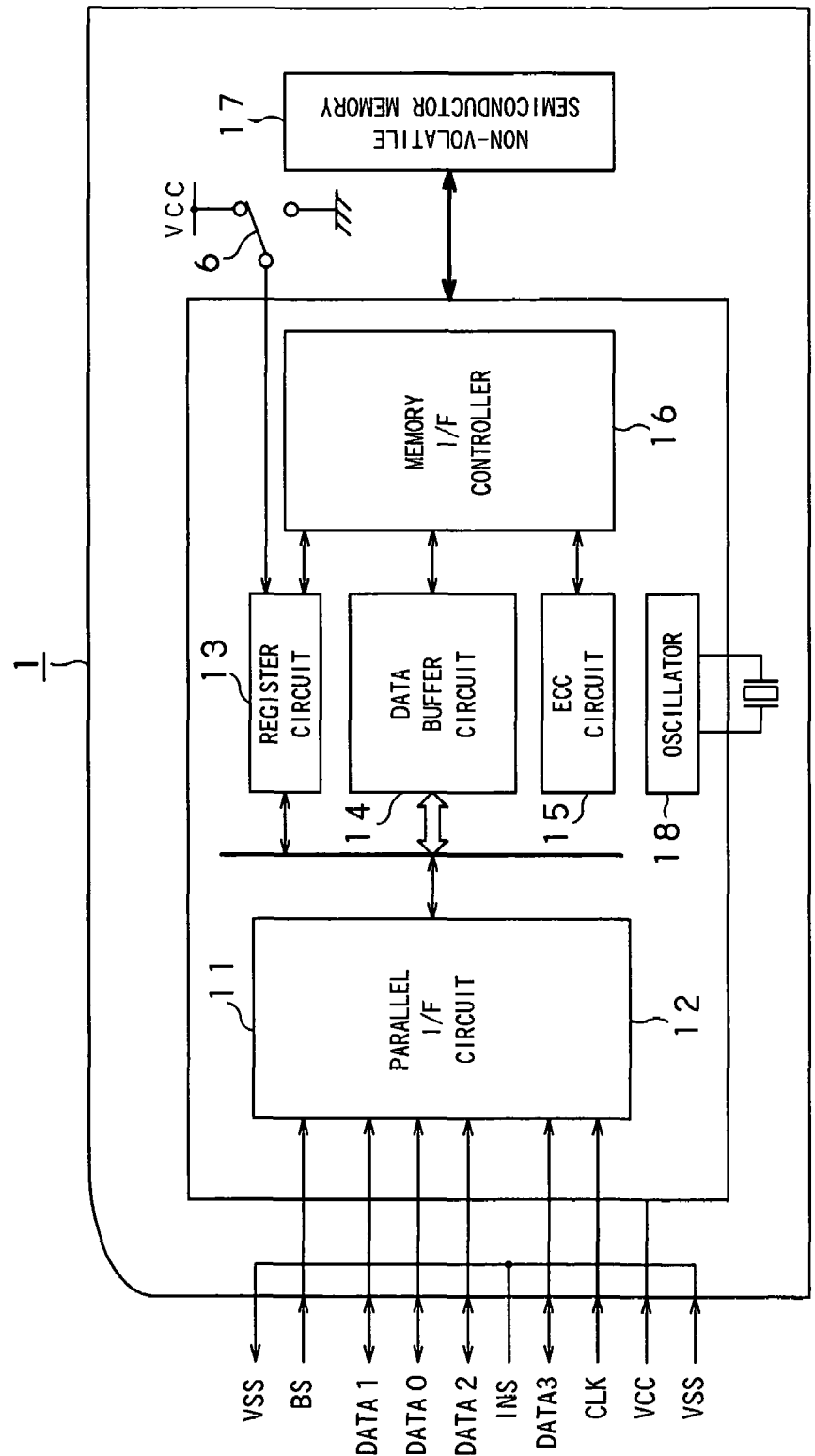
FIG. 4 is a block diagram showing an internal block structure of the memory card.

The memory card 1 of the present invention includes a parallel interfacing (I/F) circuit 12, a register circuit 13, a data buffer circuit 14, an ECC circuit 15, a memory I/F controller 16, a non-volatile semiconductor memory 17, and an oscillation controlling circuit 18, as shown in FIG. 4.

The parallel I/F circuit 12 is a circuit for transmitting data with the host device 2 using the six-line half duplex parallel type data transfer protocol.

The register circuit 13 is a circuit for storage of operation controlling commands for the memory I/F controller 16, transferred from the host equipment, the inner states of the memory card 1, various parameters needed in executing the controlling commands, or the file management information in the non-volatile semiconductor memory 17. The operation controlling commands are referred to below as control commands. This register circuit 13 is accessed from both the host device 2 and the memory I/F controller 16. Meanwhile, the host device 2 accesses the register circuit 13, using a transfer protocol command TPC as provided for on the data transfer protocol of the present memory card. That is, this TPC is used in case the host device 2 writes or reads out the control command or various parameters stored in the register circuit 13.

The data buffer circuit 14 is a memory circuit for transient storage of data written in the non-volatile semiconductor memory 17 and data read out from the non-volatile semiconductor memory 17. That is, when data is written from the host device 2 to the non-volatile semiconductor memory 17, data as a subject of writing is transferred from the host device 2 to the data buffer circuit 14 in accordance with the data transfer protocol and subsequently the data as a subject of writing, stored in the data buffer circuit 14, is written by the memory I/F controller 16 in the non-volatile semiconductor memory 17. When the data is read out from the non-volatile semiconductor memory 17 to the host device 2, the memory I/F controller 16 reads out data, as a subject of readout from the non-volatile semiconductor memory 17, to store the read-out data transiently in the data buffer circuit 14. The data as a subject of readout is then transferred from the data buffer circuit 14 to the host device 2 in accordance with the data transfer protocol.

Meanwhile, the data buffer circuit 14 has a data capacity corresponding to a preset data write unit, such as, for example, the data capacity of 512 bytes, which is the same as the page size of the flash memory. Meanwhile, the host device 2 accesses the data buffer circuit 14 using the TPC. That is, if the host device 2 writes or reads out the data stored in the data buffer circuit 14, the TPC is used.

The ECC circuit 15 appends the error correction code (ECC) to data to be written in the non-volatile semiconductor memory 17. The ECC circuit 15 performs error correction coding on the read out data based on the error correction code appended to the data read out from the non-volatile semiconductor memory 17. For example, 3 bytes of the error correction code are appended to a data unit of 512 bytes.

The memory I/F controller 16 performs control, in accordance with control commands stored in the register circuit 13, for exchanging data between the data buffer circuit 14 and the non-volatile semiconductor memory 17, supervising data security of the non-volatile semiconductor memory 17, managing the other functions of the memory card 1, and for updating the data stored in the register circuit 13.

The non-volatile semiconductor memory 17 is e.g. a non-volatile semiconductor memory, such as a NAND type flash memory. The capacity of the non-volatile semiconductor memory 17 is e.g. 16 Mbytes, 32 Mbytes, 64 Mbytes or 128 Mbytes. The erasure block unit of the non-volatile semiconductor memory 17 is e.g. 16 Kbytes. The read/write unit is also termed a page and is 512 bytes as is that of the data buffer circuit 14. The oscillation controlling circuit 18 generates operating clocks in the present memory card 1.

As the connection terminals of the memory card 1, there are provided VSS, VCC, DATA0, DATA1, DATA2, DATA3, BS, CLK and INS terminals. Since two terminals are provided as the VSS terminals, a total of ten connection terminals are provided in the memory card 1. Similar connection terminals are provided on the side of the host device 2.

To the VSS terminals is connected the VSS (reference 0 voltage). These VSS terminals connect the ground voltage of the host device to that of the memory card to establish a coincident zero volt reference potential of the host device and the memory card. The power supply voltage (VCC) is supplied to the VCC terminal from the host device.

The data signal (DATA0) of the lowermost bit of the 4-bit parallel data, transferred between the memory card 1 and the host device 2, is supplied to or output from the DATA0 terminal. The data signal (DATA1) of the second lower bit of the 4-bit parallel data, transferred between the memory card 1 and the host device 2, is supplied to or output from the DATA1 terminal. The data signal (DATA2) of the third lower bit of the 4-bit parallel data, transferred between the memory card 1 and the host device 2, is supplied to or output from the DATA2 terminal. The data signal (DATA3) of the fourth lower bit of the 4-bit parallel data, transferred between the memory card 1 and the host device 2, is supplied to or output from the DATA3 terminal.

A bus state signal is supplied from the host device to the memory card via BS terminal. A clock signal is supplied from the host device to the CLK terminal. The INS terminal is used for insertion/withdrawal detection for the host device 2 to check whether or not the memory card has been inserted into a slot formed in the host device 2. The INS terminal of the host device 2 is connected to a pull-up resistor, not shown.

Figure 5:
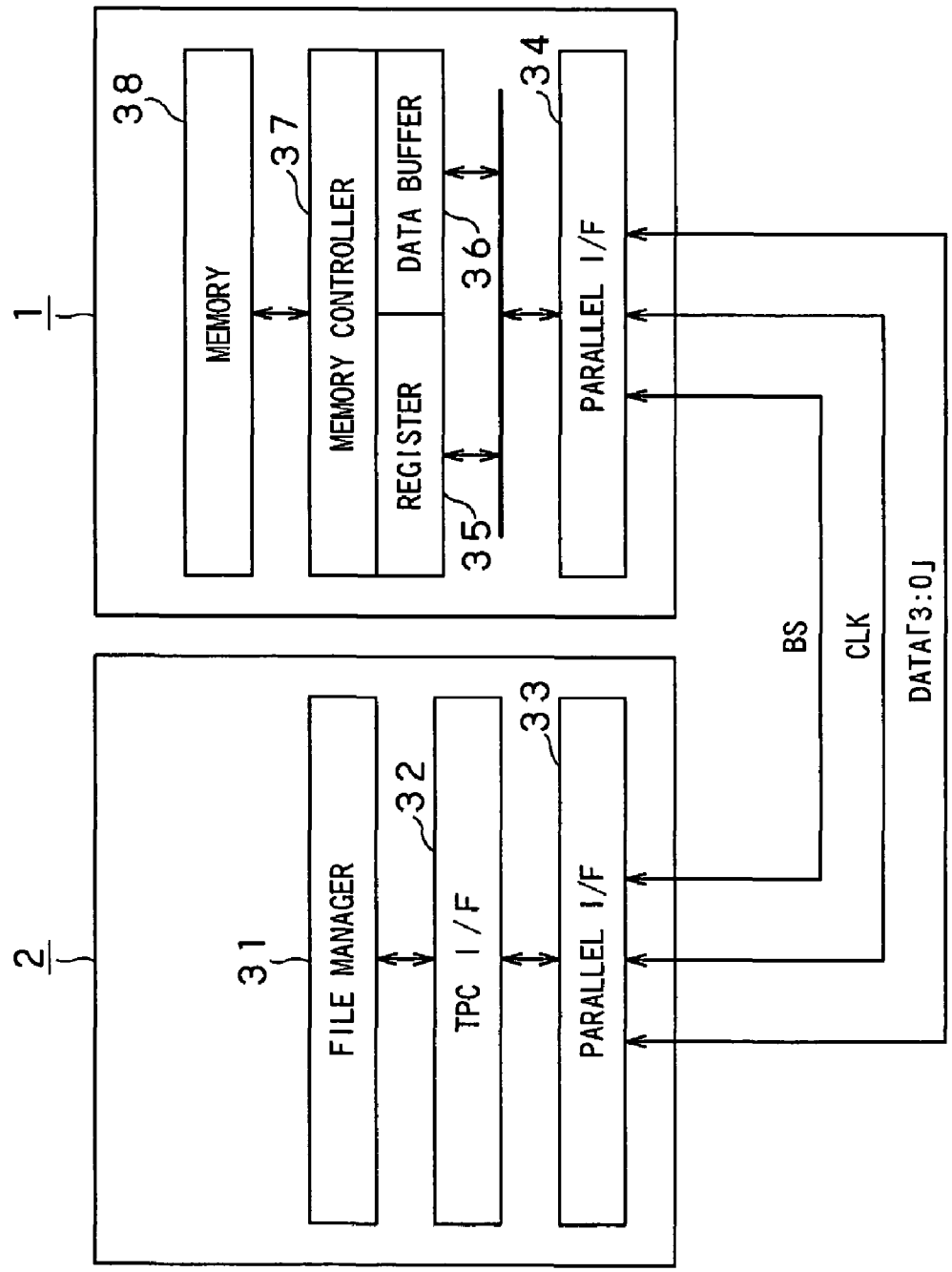
FIG. 5 shows the structure of the interfacing functions for data transfer between the memory card and the host device.

Referring to FIG. 5, the functional structure of the interface for data transfer between the memory card 1 and the host device 2 is now explained.

In FIG. 5, the interfacing functions of the host device 2 are made up by a file manager 31, a TPC interface 32, and a parallel interface 33. The interfacing functions of the memory card 1 are made up by a parallel interface 33, a register 35, a data buffer 36, a memory controller 37, and a memory 38.

The file manager 31 is an operation system of the host device and supervises the files stored in the memory card 1 and the files stored in other mediums of the host device. In the present embodiment, the MS-DOS (Microsoft Disc Operating System, registered trademark) is used as an operating system in the file manager 31. The file manager 31 also supervises the other storage mediums connected to the host device 2 by the MS-DOS. The file manager 31 is a function implemented within a controller in the host device.

The TPC interface 32 is an interfacing function as a lower layer in the file manager 31. The TPC interface 32 accesses the register 35 and the data buffer 36 in the memory card 1 by the data transfer protocol which has defined the commands peculiar to the present interface (TPC: transfer protocol command). This TPC interface 32 is a function implemented by e.g. a controller in the host device 2.

The parallel interfaces 33, 34 represent lower layers in the TPC interface 32 and proves a physical hierarchical layer of the present interfacing system. The parallel interfaces 33, 34 transfer data in accordance with a six line half duplex parallel protocol configured for transmitting six signals, namely 4-bit parallel data, a clock signal and a bus state signal. The parallel interfaces 33, 34 represent the functions implemented by the parallel I/F circuit 12.

The register 35 is designed to store control commands transmitted from the host, the inner state of the memory card, data addresses for accessing the memory 38, various parameters required in executing the memory commands, or the file management information in the memory. The register 35 is a function implemented on the register circuit 13 of the memory card 1.

The data buffer 36 is a buffer area for transient storage of data written in the memory 38 or read out from the memory 38. The data buffer 36 is a function implemented on the data buffer circuit 14 of the memory card 1.

The memory I/F controller 37 performs control in executing data readout, data write, or data erasure between the data buffer 36 and the memory 38 in accordance with the various information and commands stored in the register 35, or in updating the various information in the register 35. The memory I/F controller 37 is a function implemented by the memory I/F controller 16 on the host device 2.

The memory 38 is a data memory area and is designed as a virtual memory as an intrinsic model through the memory I/F controller 37. The memory 38 is a function implemented by the non-volatile semiconductor memory 17 on the memory card 1.

With the above-described host device and memory card, data stored in other mediums, supervised by the file manager 31, can be transferred to the memory 38 through the parallel interfaces 33, 34. Since the file manager 31 supervises the present memory card and other storage mediums by the operation system (MS-DOS), it is possible to transfer data stored in the memory 38 to the other storage mediums or to transfer data stored in the other storage mediums to the memory 38.

The physical format of the data storage area (non-volatile semiconductor memory 17) of the memory card 1 is now explained.

The memory card 1 is made up by a user area and a system area, in which to store e.g. the inner information of the present memory card 1. Both the user area and the system area can be accessed from the host device 2 using the control commands. It should be noted, however, that the user area and the system area are formed in respective different address spaces and are accessed by the host device 2 using respective different commands.

The user area is physically split in terms of a block of e.g. 64 Kbytes or 128 Kbytes as a unit. This block represents a unit of batch erasure in the present memory card 1. That is, the erasure block in the flash memory corresponds to the present block.

There are two sorts of the blocks, namely an effective block and a spare block. The effective block is where entity data of a file is recorded. The spare block is an area in which substitution data for late defects are recorded.

The user area is recognized from the host device 2 as being an area which is continuous on the sector basis. However, it is internally managed by logical block numbers, derived from sector numbers, recording valid data, and by physical block numbers. The information showing the relationship of correspondence between the logical block numbers and the physical block numbers is recorded in a redundant area, as a management area for the physical blocks, while being recorded in a system area that cannot be accessed from the host device 2 in a state the relationship of correspondence is arranged as data.

Physical block numbers specifying the block storage locations are set in each block. The physical block numbers are set uniquely, without dependency on whether a block in question is an effective block or a spare block. The logical block numbers are recoreded in the effective block. The logical block numbers are written in predetermined areas in the respective blocks. The logical block numbers are recorded at the time of initializing the present memory card 1. If malfunctions occur in a block, the logical block number of the malfunctioning block is written in the unrecorded spare block by way of substitution of the logical block number. Each block is split in terms of a write/readout unit, termed a page, as a unit. This page is in one-for-one correspondence to the sector in the logical format, as later explained.

The logical block number accorded to each block is uniquely associated with the cluster number and the LBA sector number in the logical format as later explained. The data storage area is virtually accessed from the side of the host device 2 with the logical format as later explained. However, the memory I/F controller 16 effects address conversion using a logical/physical conversion table that states the relationship of correspondence between the logical and physical addresses. Thus, the host device 2 is able to access the non-volatile semiconductor memory 17, using the logical address (cluster numbers or LBA sector numbers), without comprehending the location of physical data recording.

The physical format of the system area is hereinafter explained.

In the system area, an attribute information area exists where the information required in controlling the present memory card 1 is recorded.

The data recorded in the attribute information area has the meaning shown in FIG. 6.

In the attribute information area, "ATRB info area confirmation", "Device-information entry", "System information", "MBR Values" and "PBR Values" are recorded, as shown in FIG. 6.

In the "ATRB info area confirmation", there are included identification codes for identifying the attribute information area.

The "Device-information entry" indicates each recording position of the following "Device-information (System information, MBR Values, MBR Values and PBR Values)". The recording positions are represented by offset values of the attribute information area.

In the "System information", the internal information of the present memory card 1 is recorded. For example, in the "System information", the version, class information, number of bytes in one block, number of sectors in one block, total number of blocks, date and time of assembling, serial numbers, assembly maker numbers, flash memory maker numbers, flash memory model numbers, controller numbers, controller functions, start sector numbers of the block boundaries, and device types (read/write feasibility, read-only etc.) are recorded.

Meanwhile, the 'number of sectors contained in one block' and 'start sector number of the block boundaries' recorded in the "System information" are referenced when the host device 2 records data with the 'real-time recording mode'. The processing for the 'real-time recording mode' will be explained in detail subsequently.

In the "MBR Values", recommended parameters of 'MBR' ('Master Boot Record') prescribed on the MS-DOS are recorded. For example, in the "MBR Values", boot identification, start header number, start cylinder number, system identification, ultimate header number, ultimate sector number, ultimate cylinder number, start LBA sector number, and the partition size to be recorded in the MBR are recorded. The sector indicated in the start LBA sector number becomes the recording position for the 'PBR (Partition Boot Record)', that is, the start position of each partition prescribed on the MS-DOS. It is noted that, although plural partitions may be formed in one storage medium in the MS-DOS, it is assumed in the present embodiment that only one partition is formed in the non-volatile semiconductor memory 17.

The present invention is not limited in application to a memory card having a sole partition, but may be applied to a memory card having a plurality of partitions.

In the "PBR Values", recommended parameters of 'PBR' prescribed on the MS-DOS are recorded. For example, in the "PBR Values", the jump codes recorded in the PBR, names of OEM, versions, number of bytes per sector, number of sectors per cluster, number of reserved sectors, number of FATs (number of file allocation tables), number of root directory entries, number of sectors in a medium, medium IDs, number of sectors per head, number of heads, number of hidden sectors, total number of logical sectors, physical drive numbers, expansion boot identification, volume serial numbers, volume head, or file system types are recorded.

The above is the synopsis of the structure of the physical format of the data storage area of the memory card 1 according to the present invention (non-volatile semiconductor memory 17).

Meanwhile, in the memory card 1 according to the present invention, a command for reading out the attribute information (READ_ATRB) is set as a control command. The host device 2 reads out the "MBR Values" and the "PBR Values" using the READ_ATRB command to render it possible to initialize the memory card 1 with the logical format recommended by the assembly maker. Moreover, in the present memory card 1, there is set a command (FORMAT) for initializing the non-volatile semiconductor memory 17, as a control command. If the host device 2 issues the FORMAT command to the memory card 1, the memory I/F controller 16 refers to the "MBR Values" and the "PBR Values" recorded in the attribute information area in order to initialize the non-volatile semiconductor memory 17 in accordance with the contents of the "MBR Values" and the "PBR Values". The initialization of the memory card 1 will be explained in detail subsequently.

The logical format applied to the memory card 1 of the present invention is hereinafter explained.

The memory card 1 of the present invention uses the MS-DOS convertible format, as the logical format for the data storage area. The MS-DOS convertible format is a file system for supervising the data files recorded in a medium by a hierarchical directory structure. In the MS-DOS convertible format, access to data on the medium is made in terms of what is called a cylinder, a head, and a sector as a unit. The actual data readout/write unit to the medium is the sector. The MS-DOS convertible format provides a unit, called a cluster, for supervising the recorded data. The cluster size is a multiple of the sector size. For example, 64 sectors make up a cluster. From the operating system on the side of the host device 2, file management is made on the cluster basis.

In the logical format applied to the memory card 1 of the present invention, the cluster size is smaller than the block size and, moreover, n times the cluster size, where n is an integer not less than two, becomes the size of one block. For example, when the one-block data size is 128 Kbytes, the data size for one cluster is 32 Kbytes, that is, four clusters are recorded in one block.

The logical format applied to the memory card 1 of the present invention is set so that the boundary position of a block necessarily coincides with the boundary position of the cluster. That is, the setting is such that one cluster is not astride two blocks.

For setting the logical format to the conditions described above, it is sufficient to adjust the recording positions of the file management data of the MS-DOS, such as MBR, PBR, FAT or route directories, or parameters recorded in the respective file management data. The parameters for implementing the logical format under the above conditions are recorded in the "MBR Values" and in the "PBR Values" in the attribute information.

The contents of the file management data of the MS-DOS file are as follows:

The MBR is recorded at the leading end of a user area. The contents stated in the MBR are the same as those stated in the "MBR Values" in the attribute information.

The PBR is stated in a leading sector of each partition. The sector where the PBR is recorded is stated in the start LBA sector number in the MBR. Meanwhile, the LBA sector number is uniquely accorded to the respective sectors in the effective blocks or in the substitution blocks for the effective blocks. The LBA sector numbers are accorded in the rising order beginning from the leading sector of the block having the logical block number of 0.

The FAT is recorded over plural sectors beginning from a sector next following the PBR. The FAT represents the connecting state of files, handled in the user area, in terms of clusters as units.

The data recorded on the medium are managed in terms of clusters as units. If the main body of a file is astride plural files, it is necessary to read out a cluster to its end and subsequently to read out the next cluster. However, the next cluster is not necessarily recorded in the physically consecutive positions. Thus, in accessing data recorded on a medium, the host device 2 is in need of the information indicating which is the next cluster following a given cluster. It is in the FAT that this sort of the information is recorded.

The FAT is provided with as many storage areas as there are the clusters on the medium. The cluster numbers, beginning from $02_{hex}$, are accorded to the totality of the clusters present on the medium. To the respective storage areas in the FAT, there are uniquely accorded the cluster numbers. In each of these storage areas, the number of the cluster following the cluster to which the storage area is allocated is stored. Thus, to find the next cluster connected to a given cluster, it is sufficient to refer to the number stored in the storage area associated with the cluster in question.

Meanwhile, the present memory card 1 records two FATs (FAT1, FAT2) for backup. The physical data size of a given FAT is necessarily constant, even if the data contents are updated, because the number of clusters in the medium is unchanged.

In a route directory entry, the entry information of each file and each sub-directory arranged in a root directory is recorded. The route directory entry is recorded from the sector following the last sector in which has been recorded the FAT. The number of bytes in a given entry information is of a prescribed value, while the number of the entries arranged in the route directory is also of a prescribed value. Consequently, the data size of the route directory entry is necessarily constant. Meanwhile, as an extension of the MS-DOS compatible format, the route directory entry is not handled separately and is placed under cluster management in the FAT32 file system.

In the MS-DOS convertible format, the first cluster (cluster number "02") is initiated from the sector following the above-described file management data. That is, the sectors from the last sector in which has been recorded the route directory entry becomes an area where the actual files generated by the user are recorded. Thus, the above file management data are recorded in the present memory card 1 so that the first sector of the cluster number 02 necessarily becomes the leading sector of the block. In the present memory card 1, the LBA sector number of the leading sector of a given block in the user area is stated in the 'start sector number of the block boundary' in the attribute information.

Meanwhile, the format termed a so-called super-floppy system may be applied to the memory card 1 of the present invention. In the super-floppy system, no management data corresponding to the aforementioned MBR is provided and the PBR is recorded at the leading end of the user area. The present invention may be applied to a format where there is no MBR such as that of the super-floppy system, in addition to the MS-DOS convertible format.

The processing for initializing the memory card 1 by the host device 2 and the data recording method are hereinafter explained.

For enabling the memory card 1 of the present invention to be referenced from the operation system of the host device 2, the memory card 1 needs to be initialized by the filing system of the MS-DOS. For initializing processing, it is sufficient to record at least the file management system (MBR, PBR, FAT, or route directory entry). This initializing processing, routinely performed at the time of shipment of the memory card 1, may also be performed by the user as necessary.

There are two methods for initializing the memory card 1. The first method is to write necessary data in a predetermined sector, using the control command for writing. The second method is using the control command for initialization.

For illustrating the first and second methods, the control command is first explained.

As for the memory card 1, it is determined on the interfacing protocol that an operation controlling command is transferred from the host device 2 to the memory I/F controller 16. The control command is stored in a command register in the register circuit 13 by a command set command in the TPC from the host device 2, in a command register in the register circuit 13. If once the control command is stored in the command register, the memory I/F controller 16 executes the operation control in keeping with the control command.

The control command may be enumerated by a command for reading out data from the non-volatile semiconductor memory 17 to the data buffer circuit 14, a command for writing data from the data buffer circuit 14 to the non-volatile semiconductor memory 17, a command for erasing data on the non-volatile semiconductor memory 17, a formatting command for restoring the present memory card 1 to the state at the time of shipment from the plant, and a sleep command for halting the operation of an oscillator 18 of the memory card 1.

A specified example of the control command is hereinafter explained.

A READ_DATA command is a command for reading out data in succession from specified addresses in the user area of the non-volatile semiconductor memory 17. On receipt of this READ_DATA command, the memory I/F controller 16 references an address stored in an address register in the register circuit 13 to access the address on the non-volatile semiconductor memory 17 to read out the data from this address. The data so read out are temporarily transferred to the data buffer circuit 14. If once the data buffer circuit 14 is full, that is if 512 bytes have been read out, the memory I/F controller 16 issues a transfer request interrupt for the host device 2. When the data in the data buffer circuit 14 is read out by the host device 2, the next following data are transmitted from the non-volatile semiconductor memory 17 to the data buffer circuit 14. The memory I/F controller 16 repeats the aforementioned processing until a number of data corresponding to the number of data stored in a data count register in the register circuit 13 has been read out.

The WRITE_DATA command is a command for recording data stored in the data buffer circuit 14 in succession as from the specified address in the user area of the non-volatile semiconductor memory 17. If the WRITE_DATA command is supplied, the memory I/F controller 16 refers to the address stored in the data address register in the register circuit 13 to access the address on the non-volatile semiconductor memory 17 to write data from this address. The data written is the data stored in the data buffer circuit 14. When the data buffer circuit 14 is depleted, the 512 byte data have been written, the memory I/F controller 16 issues a transfer request interrupt to the host device 2. When the data has been written in the data buffer circuit 14 by the host device 2, the next following data are written from the data buffer circuit 14 to the non-volatile semiconductor memory 17. The memory I/F controller 16 repeats the above processing until writing a number of data corresponding to the number of data stored in the data count register in the register circuit 13.

The READ_ATRB is a command for reading out the attribute information from the non-volatile semiconductor memory 17. When supplied with this READ_ATRB, the memory I/F controller 16 reads out the attribute information in the non-volatile semiconductor memory 17 to transfer the data so read out to the data buffer circuit 14.

The FORMAT command reads out the attribute information from the non-volatile semiconductor memory 17, while reading out "MBR Values" and "PBR Values" in this attribute information to write MBR, PBR, FAT and the route directory entry in the non-volatile semiconductor memory 17 in accordance with the read-out values.

The above explanation is centered about the control command.

If the memory card 1 is to be initialized by the first method, the host device 2 reads out the "MBR Values" and "PBR Values" in the attribute information, using the READ_ATRB command. The host device 2 refers to the values stated in the "MBR Values" and "PBR Values" to generate MBR, PBR, FAT and the route directory. The host device 2 writes the so generated MBR, PBR, FAT and the route directory entry in predetermined sectors stated in the "MBR Values" and "PBR Values", using the WRITE_DATA command. By the above processing, the memory card 1 is initialized so that it can be referenced by the host device 2.

Meanwhile, the values of the MBR, PBR, FAT and, the route directory entry need not be equal to the "MBR Values" or the "PBR Values" in the attribute information and may be uniquely generated by the host device 2.

If the memory card 1 is initialized by the second method, the host device 2 sends the FORMAT command to the memory I/F controller 16 of the host device 2. When supplied with the FORMAT command, the memory I/F controller 16 reads out the "MBR Values" or the "PBR Values" in the attribute information. Based on the values stated in the so read out "MBR Values" or the "PBR Values", the memory I/F controller 16 writes the MBR, PBR, FAT and the route directory entry in the predetermined sectors in the non-volatile semiconductor memory 17. By the above processing, the memory card 1 is initialized so that it can be referenced by the host device 2.

With the memory card 1 of the present invention, described above, it is possible to selectively perform the two sorts of the initialization, namely a method in which the host device 2 writes the parameters generated by the host device 2 itself, by way of initialization, using the write command (WRITE_DATA command), and a method in which the host device 2 uses a command for initialization (FORMAT command) and in which the memory card 1 automatically performs the initialization. In initializing the memory card 1, the host device 2 is able to use the command for initialization (FORMAT command), so that it is unnecessary for dedicated parameters or an initializing program conforming to the versions or the standards to be enclosed with the result that the initialization can be achieved extremely readily.

Figure 7:
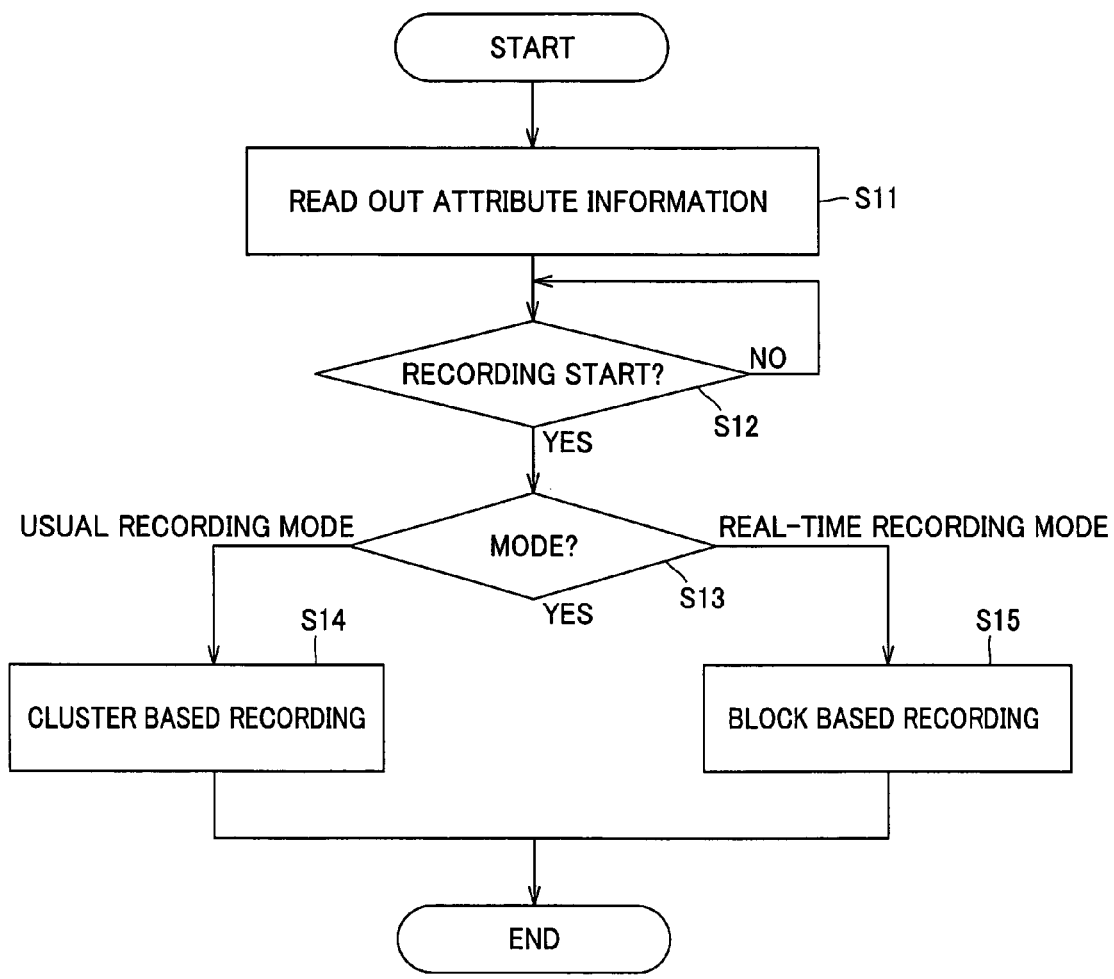
FIG. 7 is a flowchart showing data recording processing contents of the host device.

The operation when data is recorded from the host device 2 to the memory card 1 is now explained with reference to FIG. 7.

When the memory card 1 is loaded in the slot of the host device 2, the host device reads out the 'number of sectors contained in one block' and the 'start sector number of the block boundary' from the "System information" in the attribute information, using the command for reading out the attribute information (READ_ATRB command) (step S11).

The host device 2 then is in a standby state until the recording operation is started by the user (step S12).

When the recording operation is started by the user, the host device 2 checks whether the current recording mode is the real-time recording mode or the usual recording mode (step S13).

In case the recording mode is the usual recording mode, processing transfers to a step S14 and, in case the recording mode is the real-time recording mode, processing transfers to a step S15.

It is noted that the real-time recording mode is such a mode in which data recording operation must follow the recording data generating processing as in case of real-time recording of moving picture signals, or in which recording processing needs high speed recording, as in case of recording large volume data. On the other hand, the usual recording mode is such a recording mode in which high speed recording is not needed, as in case of recording a still image. The mode selection of selecting the real-time recording or the usual recording may be manually set by the user or may also be automatically set in meeting with the data recording by the host device 2.

In a step S14, recording processing is carried out on the cluster basis. That is, the FAT is referenced to retrieve a void area on the cluster basis to record data sequentially in the void area found out.

In a step S15, the FAT is referenced to find out a void area which is continuously void for one block interval. If there is such void area which is continuously void for one block interval, data is recorded in such block in succession. That is, should there be a void cluster, but data has already been recorded in another cluster of the block to which belongs the void cluster, no data is recorded in the void cluster. For example, if one block is made up by four clusters, data is recorded in the void cluster on the four-cluster basis.

The host device 2 usually is unable to recognize a block on the physical format. However, in the present memory card 1, the logical format is formed so that the block boundary position is necessarily the cluster boundary position. Thus, if the number of clusters (or sectors) in one block and the cluster number on the block boundary (or the LBA sector number) are known, the block can be recognized from the logical format. Thus, the host device 2 is able to verify the number of clusters in one block and the position of the leading cluster in the block from the 'number of sectors contained in one block' and the 'start sector number of the block boundary' referenced in the step S11.

If this real-time recording mode is applied, data can be recorded on the block basis, even for a medium in which the erasure block is larger in size than the cluster size, without employing a special file system. Thus, with the present real-time recording mode, data can be recorded without generating the garbage collection which is necessary for protecting the recorded data, and hence recording can be carried out more speedily than if the data is recorded on the cluster basis as usual.

Meanwhile, in the usual file system, it is possible to confirm the vacant capacity in the medium before or during data recording. When the usual recording mode is selected, the host device 2 simply detects the number of void clusters form the FAT to calculate the void capacity. If conversely the real-time recording mode is selected, simply the number of void clusters is detected from the FAT to calculate the void capacity. If conversely the real-time recording mode has been selected, such a block in which the totality of the clusters are unrecorded is detected from the FAT and the void capacity is calculated from the number of the blocks.

A specified instance of formatting of the memory card 1 is now shown. The formatting instance, now explained, is for the memory card 1 in which the total capacity is 64 Mbytes, the sector size is 512 bytes, the cluster size is 32 Kbytes, a block size is 128 Kbytes, and the number of sectors needed for recording one FAT is eight. Thus, each cluster is made up by 64 sectors, with each block being made up by four clusters. Meanwhile, in the present instance, such a case is explained in which FAT 16, used in case the total number of clusters exceeds 4085, as an MS-DOS type, is explained. In the FAT 16, the number of bytes allocated to each cluster in the FAT is 2 bytes (16 bits).

FIG. 8 shows an image of a medium of a first specified example. FIG. 9 shows the values of respective parameters of the first specified instance. FIGS. 10 and 11 show the contents of description of the MBR and the PBR of the first specified instance, respectively.

The LBA sector number is a number uniquely attached to the totality of the effective blocks in the medium, without regard to the partitions or boot areas. As for the LBA sector number, the leading sector number is 0, and is sequentially incremented by 1. The block number is the logical block number accorded to each effective block. As for the block number, the leading block is 0 and is sequentially incremented by 1. Meanwhile, in case of substitution of the effective blocks, the LBA sector number and the block number are accorded to the substituted blocks.

In the first specified instance, the MBR is recorded in the leading sector of the block number 0 (with the LBA sector number of 0). The PBR is recorded in the sector of the LBA sector number 462 of the block number 1. The FAT1 and the FAT2 are recorded in the sectors of the LBA sector numbers 464 to 479 of the block number 1. The route directory entry is recorded in the sectors with the sector numbers of 480 to 511 of the block number 1.

By recording the MBR, PBR, FAT and the route directory entry as described above, the leading sector (leading sector of the cluster 2) where there is recorded the file generated by the user is recorded as from the leading sector of the block 2 (LBA sector number 512). As a result, the logical format is such a one in which the block boundary position is coincident with the cluster boundary position.

A second specified instance of a specified format of the memory card 1 is now explained.

FIG. 12 shows an image of a medium of the second specified instance. FIG. 13 shows the values of respective parameters of the second specified instance. FIGS. 14 and 15 show the contents of description of the MBR and the PBR of the second specified instance, respectively.

The LBA sector number is a number uniquely attached to each of the effective blocks in the medium, without regard to the partitions or boot areas. As for the LBA sector numbers, the leading sector number is 0, and is sequentially incremented by 1. The block number is the logical block number accorded to the respective effective blocks. As for the block number, the leading block is 0 and is sequentially incremented by 1. Meanwhile, in case of substitution of the effective blocks, the LBA sector number and the block number are accorded to the substituted blocks.

In the second specified instance, the MBR is recorded in the leading sector of the block number 0 (with the LBA sector number of 0). The PBR is recorded in the sector of the LBA sector number of 335 of the block number 1. The FAT1 and the FAT2 are recorded in the sectors of the LBA sector numbers 336 to 351 of the block number 1. The route directory entry is recorded in the sectors with the sector numbers of 352 to 383 of the block number 1.

By recording the MBR, PBR, FAT, and the route directory entry as described above, the leading sector (leading sector of the cluster 2), where the file generated by the user is recorded, is recorded as from the LBA sector number 384 of the block 1. As a result, the logical format is such a one in which the block boundary position is coincident with the cluster boundary position.

In both the first and second specified instances, the block boundary position is the cluster boundary position and block-based batch recording may be made from the host device 2, that is, recording can be made on the four-cluster basis.

Meanwhile, in the FAT16 format, the leading eight bytes are of a prescribed value of "F8FF FFFF". The FAT16 format also prescribes the area of each cluster every four bytes as from the ninth byte. The cluster number of the first cluster is "2". In the present instance, the number of bytes per sector is 512. Thus, in the first sector of the FAT, a cluster area from the cluster number 2 to the cluster number 127 is formed.

Figure 16:
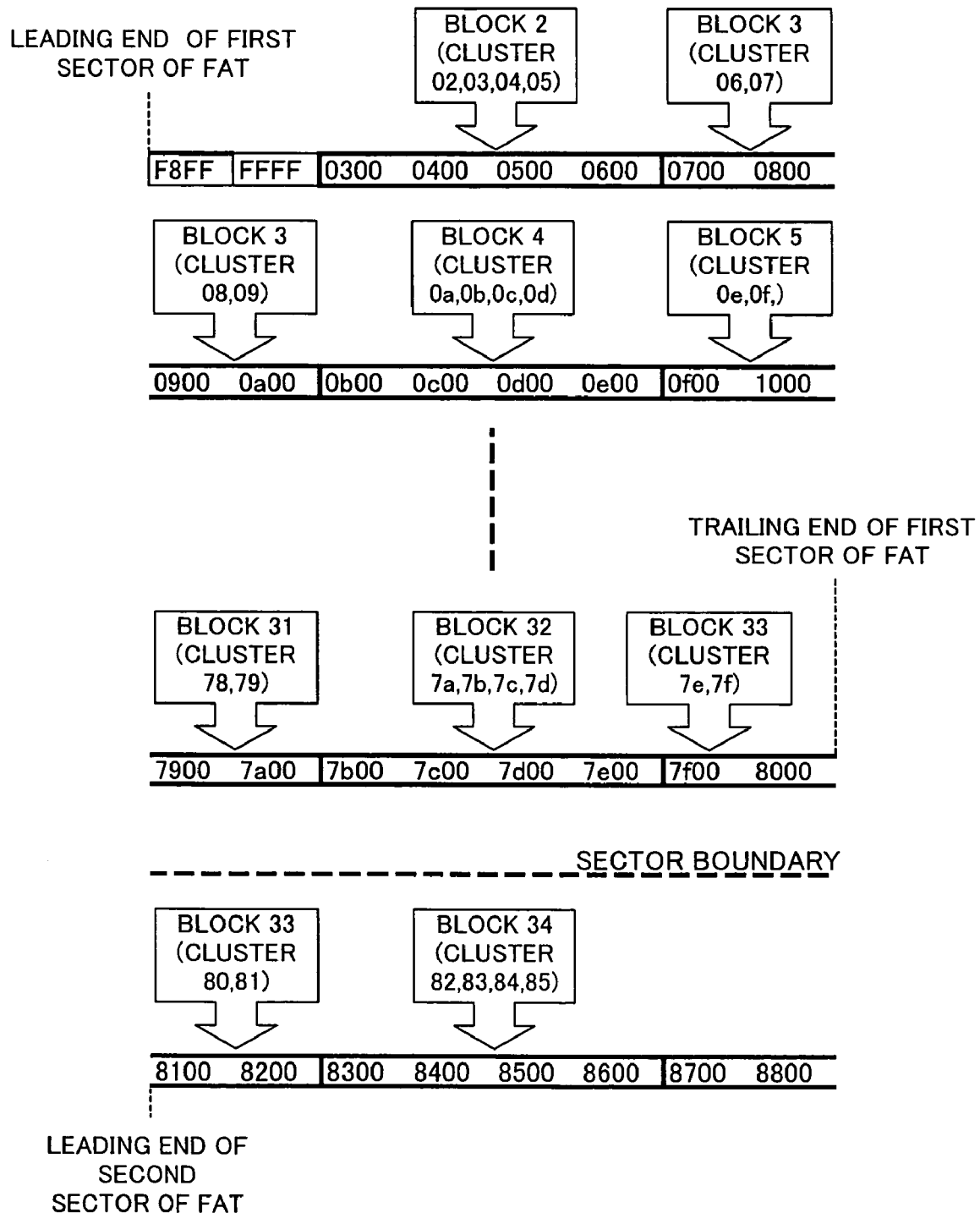
FIG. 16 depicts the state of the FAT in case the format of the first specified instance is applied.

In the case of the format of the first specified instance, the block 2 is formed by the cluster numbers of 02, 03, 04, and 05, the block 3 is formed by the cluster numbers of 06, 07, 08, and 09, the block 4 is formed by the cluster numbers of 0a, 0b, 0c and 0d and so forth, so that, subsequently, each one block is formed by four clusters, as shown in FIG. 16. Moreover, in the case of the format of the first specified instance, the leading sector of the FAT ends with the second cluster (cluster 7f) of the block 33. The second sector of the FAT begins with the third cluster (cluster 80) of the block 33. That is, in the format of the first specified instance, the block boundary represented in the FAT is not coincident with the actual sector position of the FAT.

Figure 17:
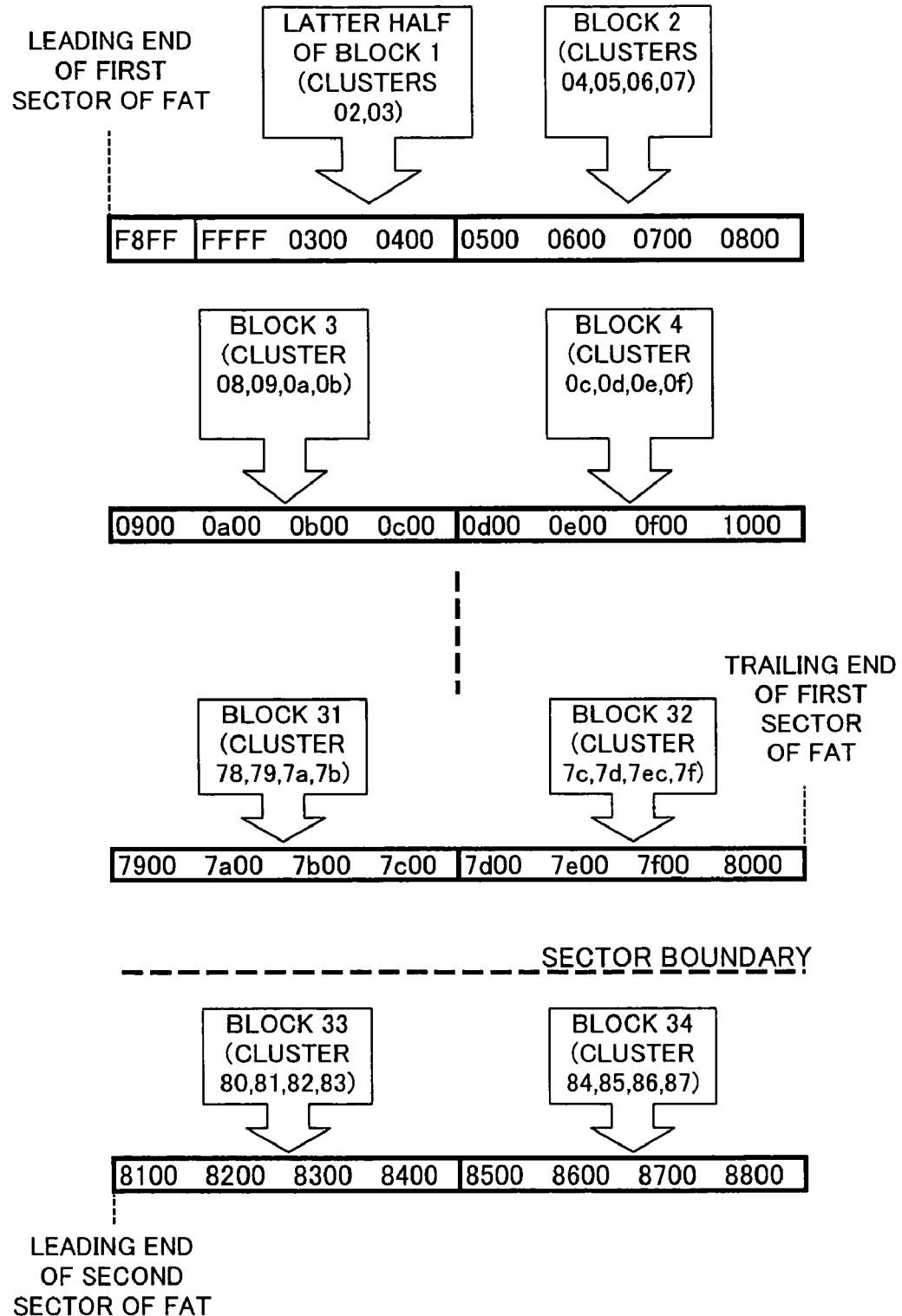
FIG. 17 depicts the state of the FAT in case the format of the second specified instance is applied.

On the other hand, with the format of the second specified instance, the block 1 is formed by the cluster numbers of 02 and 03, the block 2 is formed by the cluster numbers of 04, 05, 06, and 07, the block 3 is formed by the cluster numbers of 08, 09, 0a, and 0b, the block 4 is formed by the cluster numbers of 0c, 0d, 0e, and 0f, and so forth, so that, subsequently, each one block is formed by four clusters, as shown in FIG. 17. Moreover, in the case of the format of the second specified instance, the leading sector of the FAT ends with the fourth cluster of the block 32, that is the last cluster in the block (cluster 7f). The second sector of the FAT begins with the first cluster of the block 33. That is, in the format of the second specified instance, the block boundary position represented in the FAT is coincident with the actual sector position of the FAT.

If the actual sector boundary of the FAT is not coincident with the block boundary, represented by the FAT, and the cluster information of the block lying at the sector boundary is to be read, two sectors must be read. If conversely the actual sector boundary of the FAT is coincident with the block boundary, represented by the FAT, it suffices to read out only one sector, even in case the cluster information of the block lying at the sector boundary is to be read.

Thus, the file management on the side of the host device 2 is easier with the format of the second specified instance than with the format of the first specified instance.

In both the first and second instances, the MBR is recorded in a sole block. That is, the MBR is recorded in a block different than the PBR, FAT, or the route directory entry. By recording the MBR in the sole block, it becomes possible to provide for file safety in case of a medium where a batch erasure unit is fixed, as in a flash memory. That is, since the MBR is recorded in the PBR, FAT, or root directory entry that is liable to be rewritten or in a block different from real data, it becomes unnecessary to rewrite MBR, thus assuring the file safety.

This recording of the MBR in a block different than the block in which to record the PBR, FAT, or the route directory entry may be applied even in a case different from the case of the present memory card 1 in which the block size is larger than the cluster size.

Usually, the MBR, PBR, FAT, and the route directory entry are recorded in succession on the sector basis, without regard to the block position, as shown in FIG. 18. That is, the MBR and the PBR are recorded in the sector of sector number 0 and in the sector of sector number 1, respectively.

If conversely the cluster size is smaller than the block size, as when the cluster size is 32 Kbytes and the block size is 16 Kbytes, it is sufficient if the MBR is recorded in the sector of the sector number 0 and the PBR is recorded in the sector of the sector number 47, as shown in FIG. 19.

In the case of a memory card in which the cluster size is equal to the block size, as when the cluster size is 16 Kbytes and the block size is 32 Kbytes, it is sufficient if the MBR is recorded in the sector of the sector number 0 and the PBR is recorded in the sector of the sector number 79, as shown in FIG. 20.

The present invention is not limited to the instances described with reference to the drawings and, as may be apparent to those skilled in the art, various changes, substitutions or equivalents may be envisaged without departing from the scope and the purport of the invention as defined in the appended claims.

INDUSTRIAL APPLICABILITY

With the data storage device according to the present invention, the file management data for logical formatting may be recorded on a semiconductor memory, depending on parameters stored in the data storage device, when an initialization command is received from a host device, so that the initialization can be achieved extremely readily without the host device having to be provided with a control program or parameters for initialization.

The invention claimed is:

1. A removable data storage device, detachably mounted to a host device, comprising
a non-volatile semiconductor memory,
wherein data recorded thereon is erased as a block of a predetermined data volume,
wherein the non-volatile semiconductor memory is divided into a user area and a system area,
wherein the user area is internally managed by logical block numbers and by physical block numbers, and
wherein file management data is recorded in said user area in accordance with the logical block numbers and the physical block numbers;
an interface for inputting/outputting data between the data storage device and said host device; and
a controller for controlling file management in the semiconductor memory in response to a command from said host device over said interface,
wherein file management is performed using at least one block area,
wherein the block area is divided into a plurality of clusters,
wherein each cluster is a size equal to 1/n times the size of said block, n being an integer not less than two,
wherein parameters for recording said file management data on said user area are stored in a system information storage unit, and
wherein said controller records the file management data in the semiconductor memory when supplied with an initialization command from said host device.

2. The data storage device according to claim 1 wherein, when supplied with a parameter readout command from said host device, said controller sends the parameters, stored in said system information storage unit, to said host device over said interface.

3. The data storage device according to claim 1 wherein said system information storage unit is formed on said semiconductor memory.

4. The data storage device according to claim 2 wherein said file management data is in a logical format which supervises recording of data by setting logical addresses from one sector as a data read/write unit to another and in which said cluster is made up by a predetermined number of sectors.

5. The data storage device according to claim 4 wherein said logical format is one in which the leading sector in each block in said user area is coincident with the leading sector of said cluster.

6. The data storage device according to claim 5 wherein said file management data is made up by a master boot record (MBR), recorded in a sector of a leading logical address of said user area, a partition boot record (PBR), recorded in a sector of a leading logical address of each partition formed in said user area, a file allocation table (FAT) recorded across a plurality of sectors beginning from the sector of the logical address next following each PBR, and a route directory entry recorded across a plurality of sectors beginning from the sector of the next logical address to each FAT;

said MBR stating the logical address of the sector where the PBR has been recorded;
said PBR stating the information pertinent to the partition where said PBR has been recorded;
said FAT having formed, in association with the totality of the clusters in the partition, an area for storage of the interconnection information specifying the cluster connected next to a cluster in question;
said route directory entry stating the entry information for a file arranged in the uppermost directory and a sub-directory;
said entity data recorded in each partition being recorded as from a sector next following the route directory entry.

7. The data storage device according to claim 6 wherein said logical format is set so that a recording area for the interconnection information for n consecutive clusters recorded in one block is formed in a self-complete form in one sector.

8. A host device to which a removable data storage device is detachably mounted, said host device including a host-side interface for accessing said data storage device;

said data storage device including
a non-volatile semiconductor memory,
wherein data recorded thereon is erased as a block of a predetermined data volume,
wherein the non-volatile semiconductor memory is divided into a user area and a system area,
wherein the user area is internally managed by block numbers and by physical block numbers, and
wherein file management data is recorded in said user area in accordance with the logical block numbers and the physical block numbers;
an interface for inputting/outputting data between the data storage device and said host device, and
a controller for controlling file management in the semiconductor memory in response to a command from said host device over said interface,
wherein file management is performed using at least one block area,
wherein the block area is divided into a plurality of clusters,
wherein each cluster is a size equal to 1/n times the size of said block, n being an integer not less than two,
wherein parameters for recording said file management data on said user area are stored in a system information storage unit, and wherein said controller records the file management data in the semiconductor memory when supplied with an initialization command from said host device.

9. The host device according to claim 8 wherein, when supplied with a parameter readout command from said host device, said controller of the data storage device sends the parameters, stored in said system information storage unit, to said host device over said interface.

10. The host device according to claim 8 wherein said system information storage unit is formed on said semiconductor memory.

11. The host device according to claim 9 wherein said file management data is a logical format which supervises recording of data by setting logical addresses from one sector as a data read/write unit to another and in which said cluster is made up by a predetermined number of sectors.

12. The host device according to claim 11 wherein said logical format is one in which the leading sector in each block in said user area is coincident with the leading sector of said cluster.

13. The host device according to claim 12 wherein said file management data is made up by a master boot record (MBR), recorded in a sector of a leading logical address of said user area, a partition boot record (PBR), recorded in a sector of a leading logical address of each partition formed in said user area, a file allocation table (FAT) recorded across a plurality of sectors beginning from the sector of the logical address next following each PBR, and a route directory entry recorded across a plurality of sectors beginning from the sector of the next logical address to each FAT;

said MBR stating the logical address of the sector where the PBR has been recorded;
said PBR stating the information pertinent to the partition where said PBR has been recorded;
said FAT having formed, in association with the totality of the clusters in the partition, an area for storage of the interconnection information specifying the cluster connected next to a cluster in question;
said route directory entry stating the entry information for a file arranged in the uppermost directory and a sub-directory;
said entity data recorded in each partition being recorded as from a sector next following the route directory entry.

14. The host device according to claim 13 wherein said logical format is set so that a recording area for the interconnection information for n consecutive clusters recorded in one block is formed in a self-complete form in one sector.

15. A data recording system including a host device and a removable data storage device, detachably mounted to said host device, wherein said data storage device includes a non-volatile semiconductor memory,
wherein data recorded thereon is erased as a block of a predetermined data volume,
wherein the non-volatile semiconductor memory is divided into a user area and a system area,
wherein the user area is internally managed by logical block numbers and by physical block numbers, and
wherein file management data is recorded in said user area in accordance with the logical block numbers and the physical block numbers;
an interface for inputting/outputting data between the data storage device and said host device; and
a controller for controlling file management in the semiconductor memory in response to a command from said host device over said interface, wherein file management is performed using at least one block area, wherein the block area is divided into a plurality of clusters, wherein each cluster is a size equal to 1/n times the size of said block, n being an integer not less than two, wherein parameters for recording said file management data on said user area are stored in a system information storage unit, and wherein said controller records the file management data in the semiconductor memory when supplied with an initialization command from said host device.

16. The data recording system according to claim 15 wherein, when supplied with a parameter readout command from said host device, said controller sends the parameters, stored in said system information storage unit, to said host device over said interface.

17. The data recording system according to claim 15 wherein said system information storage unit is formed on said semiconductor memory.

18. The data recording system according to claim 16 wherein said file management data is a logical format which supervises recording of data by setting logical addresses from one sector as a data read/write unit to another and in which said cluster is made up by a predetermined number of sectors.

19. The data recording system according to claim 18 wherein said logical format is one in which the leading sector in each block in said user area is coincident with the leading sector of said cluster.

20. The data recording system according to claim 19 wherein said file management data is made up by a master boot record (MBR), recorded in a sector of a leading logical address of said user area, a partition boot record (PBR), recorded in a sector of a leading logical address of each partition formed in said user area, a file allocation table (FAT) recorded across a plurality of sectors beginning from the sector of the logical address next following each PBR, and a route directory entry recorded across a plurality of sectors beginning from the sector of the next logical address to each FAT;

said MBR stating the logical address of the sector where the PBR has been recorded;

said PBR stating the information pertinent to the partition where said PBR has been recorded;

said FAT having formed, in association with the totality of the clusters in the partition, an area for storage of the interconnection information specifying the cluster connected next to a cluster in question;

said route directory entry stating the entry information for a file arranged in the uppermost directory and a subdirectory;

said entity data recorded in each partition being recorded as from a sector next following the route directory entry.

21. The data recording system according to claim 20 wherein said logical format is set so that a recording area for the interconnection information for n consecutive clusters recorded in one block is formed in a self-complete form in one sector.

22. A data management method for a removable data storage device, detachably mounted to a host device, said data storage device including:

a non-volatile semiconductor memory, wherein data recorded thereon is erased as a block of a predetermined data volume, wherein the non-volatile semiconductor memory is divided into a user area and a system area, wherein the user area is internally managed by logical block numbers and by physical block numbers, and wherein file management data is recorded in said user area in accordance with the logical block numbers and the physical block numbers, the method comprising the steps of:

inputting/outputting data between the data storage device and said host device; and controlling file management in the semiconductor memory in response to a command from said host device over said interface, wherein file management is performed using at least one block area, wherein the block area is divided into a plurality of clusters, wherein each cluster is a size equal to 1/n times the size of said block, n being an integer not less than two, wherein parameters for recording said file management data on said user area are stored in a system information storage unit, and wherein said controller records the file management data in the semiconductor memory when supplied with an initialization command from said host device.

23. The data management method according to claim 22 wherein, when a parameter readout command is supplied from said host device, the parameters stored in said system information storage unit are transmitted to said host device over said interface.

24. The data management method according to claim 22 wherein said system information storage unit is formed on said semiconductor memory.

25. The data management method according to claim 23 wherein said file management data is a logical format which supervises recording of data by setting logical addresses from one sector as a data read/write unit to another and in which said cluster is made up by a predetermined number of sectors.

26. The data management method according to claim 25 wherein said logical format is one in which the leading sector in each block in said user area is coincident with the leading sector of said cluster.

27. The data management method according to claim 26 wherein said file management data is made up by a master boot record (MBR), recorded in a sector of a leading logical address of said user area, a partition boot record (PBR), recorded in a sector of a leading logical address of each partition formed in said user area, a file allocation table (FAT) recorded across a plurality of sectors beginning from the sector of the logical address next following each PBR, and a route directory entry recorded across a plurality of sectors beginning from the sector of the next logical address to each FAT;

said MBR stating the logical address of the sector where the PBR has been recorded;

said PBR stating the information pertinent to the partition where said PBR has been recorded;

said FAT having formed, in association with the totality of the clusters in the partition, an area for storage of the interconnection information specifying the cluster connected next to a cluster in question;

said route directory entry stating the entry information for a file arranged in the uppermost directory and a subdirectory;

said entity data recorded in each partition being recorded as from a sector next following the route directory entry.

28. The data management method according to claim 27 wherein said logical format is set so that a recording area for the interconnection information for n consecutive clusters recorded in one block is formed in a self-complete form in one sector.

* * * * *